F. W. MATTHIESSEN, Jr.
METAL SHEARING MACHINE.
APPLICATION FILED SEPT. 21, 1908.
921,861.
Patented May 18, 1909.
3 SHEETS—SHEET 1.
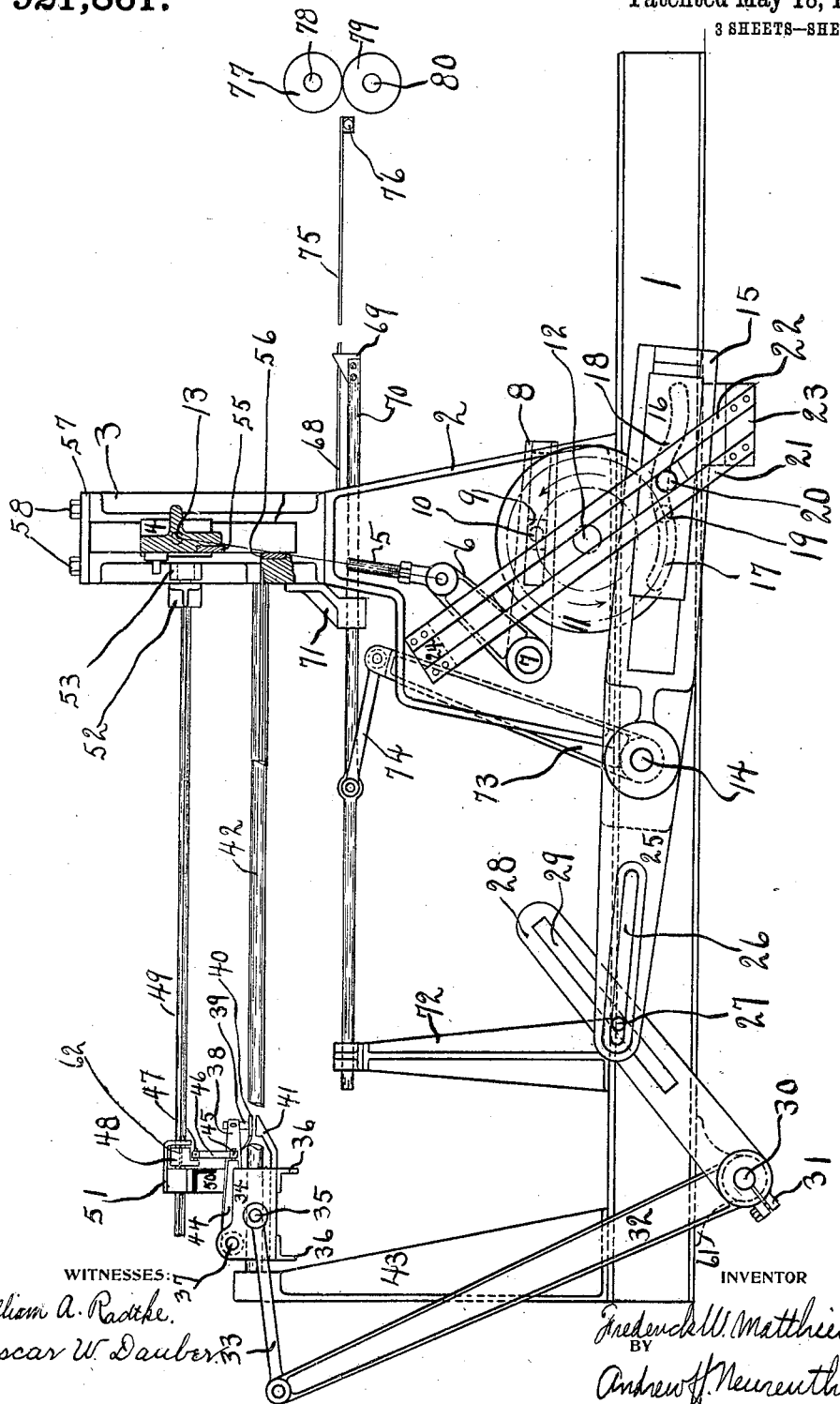
Fig. I.
WITNESSES:
William A. Radtke.
Oscar W. Dauber.
INVENTOR
Frederick W. Matthiessen Jr.
BY
Andrew J. Neureuther
ATTORNEY

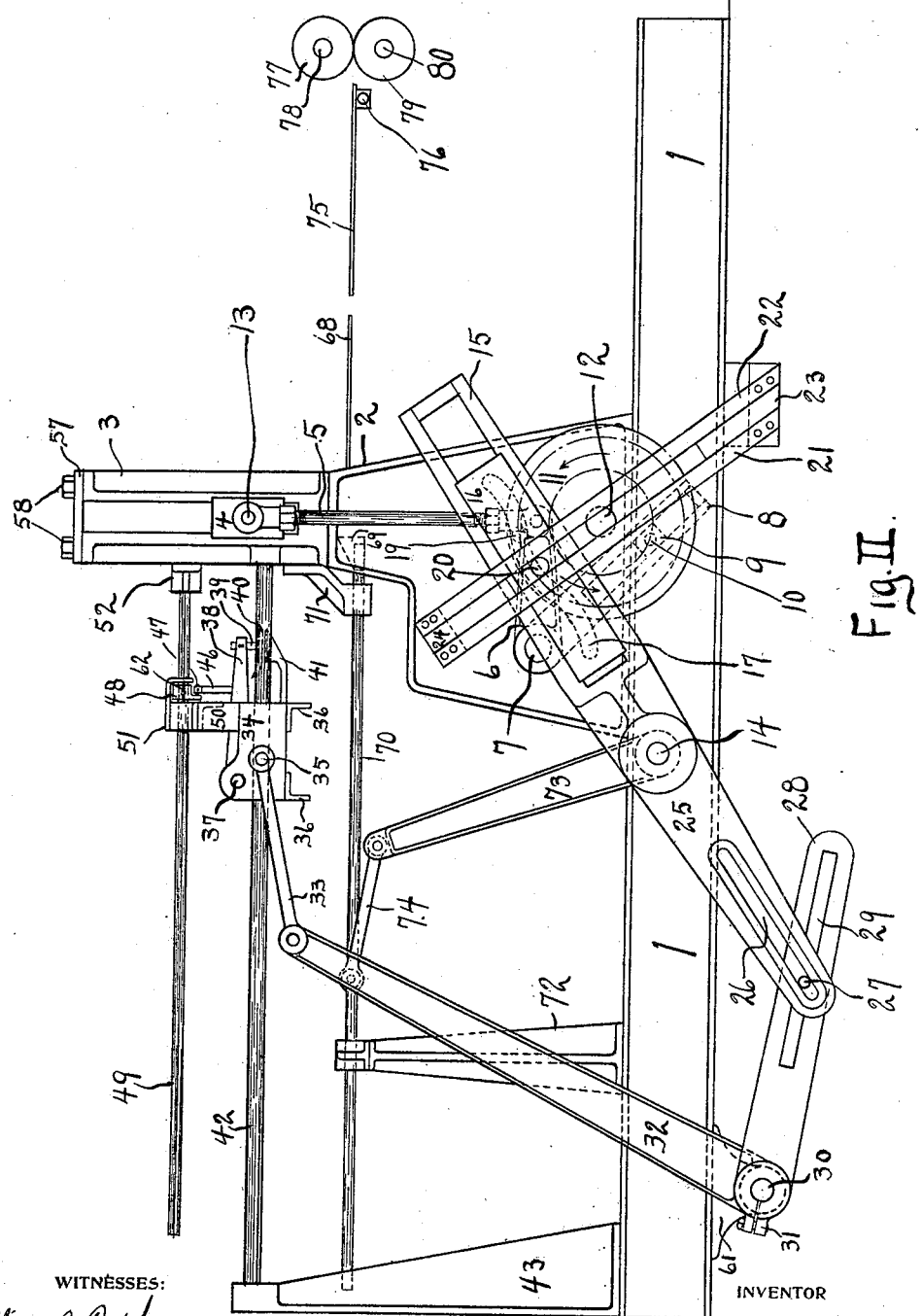

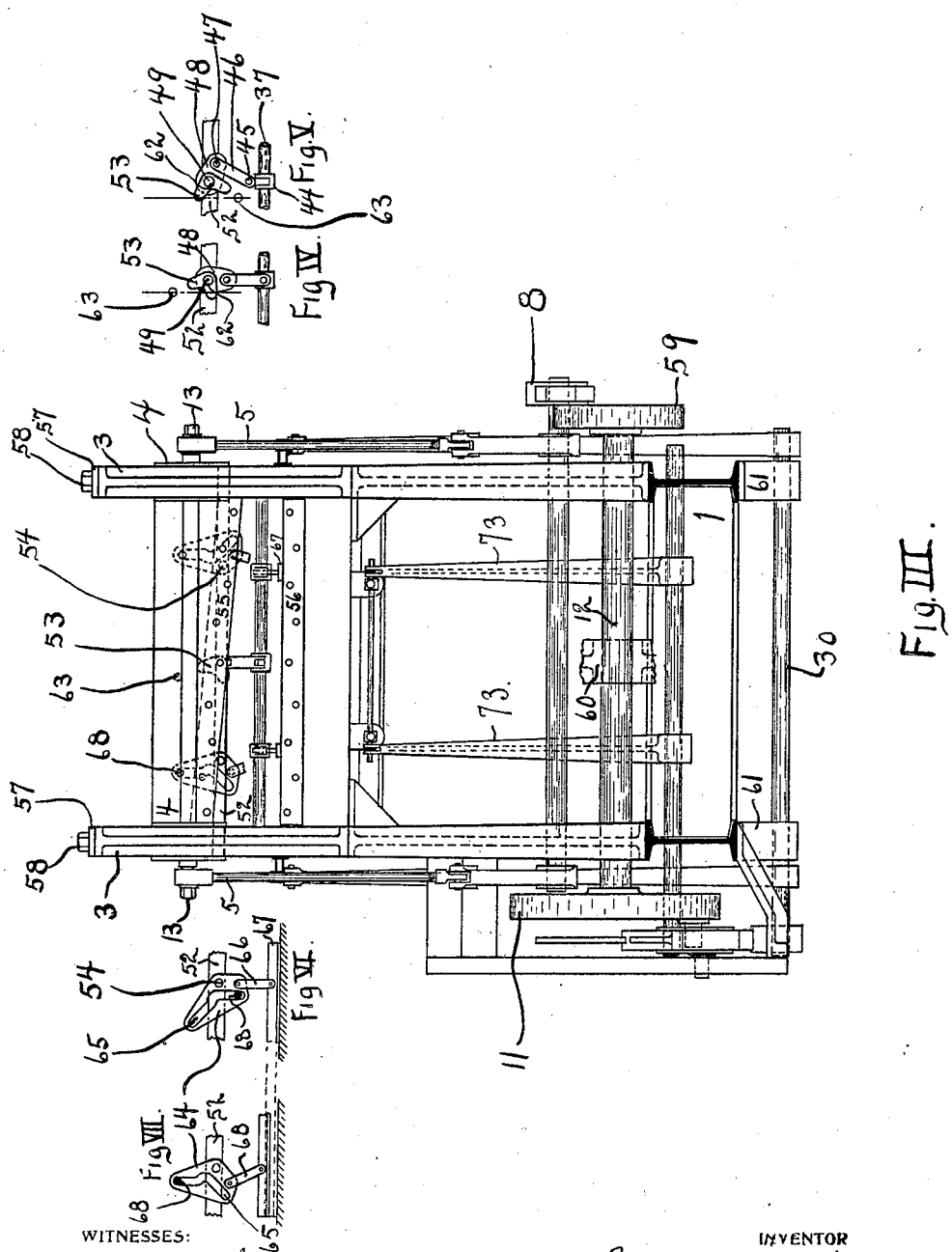

UNITED STATES PATENT OFFICE.

FREDERICK W. MATTHIESSEN, JR., OF LA SALLE, ILLINOIS, ASSIGNOR TO THE LA SALLE MACHINE & TOOL COMPANY, OF LA SALLE, ILLINOIS, A CORPORATION OF ILLINOIS.

METAL-SHEARING MACHINE.

No. 921,861.  Specification of Letters Patent.  Patented May 18, 1909.

Application filed September 21, 1908. Serial No. 453,972.

*To all whom it may concern:*

Be it known that I, FREDERICK W. MATTHIESSEN, Jr., a citizen of the United States, and resident of the city of La Salle, county of Lasalle, and State of Illinois, have invented certain new and useful Improvements in Metal-Shearing Machines, of which the following is a specification.

My invention relates to improvements in metal shearing machines in which the shear blade has a reciprocating motion and has for its object the production of a metal shearing machine in which a sheet of metal, when fed, is automatically held and fed under the shear blade and cut, the sheet being held firmly during the cutting operation, producing pieces of exactly the same size.

A further object of my invention and which assists me in obtaining great accuracy in cutting many pieces of the same size, is to produce a dwell or pause in the travel of the feeding devices during the period when said sheet is grasped by the clamping devices. Its further object consists in the production of the novel means shown, described and claimed in the specification.

I attain these objects by the mechanism shown in the accompanying drawings, in which—

Figure 1 is a side view of my invention showing the shear blade in its upper position and the sheet feeding device in its rear position. Fig. 2 is a side view of my invention showing the shear blade in its lower or cutting position and the sheet feeding device in its forward position. Fig. 3 is a front view of my invention. Fig. 4 is a view of the cam which operates the sheet clamp on the sheet feeding mechanism and shows its position when sheet is clamped. Fig. 5 is a view of the cam etc. in Fig. 4 when it is not clamping the sheet. Fig. 6 is a view showing the clamping device which holds the sheet during the cutting operation and shows it clamping the sheet. Fig. 7 is a view of the device shown in Fig. 6 when it is not clamping the sheet.

In the drawings, 1 is the base of the machine, 2 is a standard mounted thereon, 3 is the shear blade frame in which is slidably mounted the shear crosshead 4 which carries the upper shear blade 55 which passes the edge of the lower shear blade 56, fastened to the frame 3. Plates 57 and bolts 58 secure the upper ends of guides on shear blade frame 3 as shown. Shear crosshead 4 has a pin or journal 13 on each of its ends on which is journaled an adjustable link 5 whose length can be regulated by the nuts shown. Each link 5 is pivotally connected with a lever 6 fastened to a shaft 7 journaled in standards 2 as shown. Mounted on, and fastened on said shaft 7 is a lever 8 having a forked end in which slides a block 9 which is journaled on a pin 10 fastened to a circular disk 59 (see Fig. 3) which is rigidly mounted on a shaft 12 journaled in said standards 2. Shaft 12 is the main or driving shaft and has mounted on it the driving pulley 60 by means of which the machine is driven from a motor, line shaft or other source of power. It is evident that as disk 59 rotates, the shear crosshead 4 is given a vertical reciprocating motion.

Mounted on and fastened to the other end of shaft 12 is a circular disk 11 which carries a pin 19 which actuates a sliding block 16 by means of cam grooves 17 and 18 which connect with each other making a continuous path, each groove having pre-determined curvature whose function will be described farther along. Sliding block or crosshead 16 is slidably mounted in a guideway 15 in one end of a lever 25, fastened to a shaft 14 journaled in the base of the machine. Sliding block 16 has a pin 20 fastened to it which slides in the space between the parallel bars 21 and 22 which are fastened to projections 23 and 24 from the base 1 and the standard 2 respectively. These parallel bars 21 and 22 constrain the motion of the sliding block 16 so as to move it along them as it is actuated by means of pin 19 on disk 11, which pin slides in the curved paths 17 and 18 in said block 16. Block 16 is further constrained by means of the guides 15 in lever 25 and prevented from rotating. In this particular machine the curved paths 17 and 18 are parts of a circular groove concentric with circles which touch the inside and outside of pin 19 so that when sliding block 16 is in the position shown in Fig. 1 the block 16 is stationary, while the pin 19 traverses that part of the curved path 17. It is evident that when the sliding block 16 is stationary, the lever 25 which is controlled by it is stationary, so that a " dwell " is produced in the system of levers operated by this lever 25, while the disk 11, with pin 19 is rotating, as is the remainder of the machine. The part of the curved path 18 has the same radius as the part of the curved path 17, except that the curvature is reversed from that of 18, because as seen, when sliding block 16 has moved along the parallel bars 21 and 22 until it is in the upper position shown in Fig. 2, the pin traverses that part of the curved path 18 and produces a similar dwell to that above described.

Lever 25 has a slot 26 on its other end, in which slot is a bolt or pin 27 which can be locked at any point along said slot 26. Pin 27 travels in a slot 29 in lever 28, which lever 28 is fastened to a shaft 30 journaled in bearing 61 fastened to 1, by means of bolt 31 passing through the projections shown on lever 28. Mounted on each end of shaft 30 is a lever 32 whose upper end is connected to the sheet feeding crosshead 34 by means of a link 33 pivotally connected to said lever 32 and a pin 35 on said sheet feeding crosshead 34. Sheet feeding crosshead 34 is slidably mounted on the guide-bars 42, one end of which is fastened in frame 3 and the other is fastened in standards 43 which are fastened to the base 1.

The sliding members of the crosshead 34 are fastened together by means of angle bars 36 which support the lower jaws 41 of the sheet clamping device shown. These devices each consist of a presser foot 40 on a stem 39, which is adjustably fastened to a lever 38 which is mounted on a shaft 37 journaled in the sliding member of crosshead 34. This shaft 37 (and the presser feet 40 which are fastened to it) are actuated at the proper time during the lower "dwell" period above described by the following means: A lever 44 rigidly mounted on said shaft 37 is pivotally connected to a link 46 by means of a joint 45, which link 46 is similarly connected to a lever 48 by means of joint 47. Lever 48 is mounted on a shaft 49 which is journaled in a standard 50 from crosshead 34 and in a crossbar 52 fastened to the frame 3. Shaft 49 has a keyway cut its entire length into which fits a key 62 which is fastened to the lever 48. This construction permits the lever 38 to slide along shaft 49 and make lever 48 rotate with it. The piece 51 maintains the position of lever 48 with reference to the crosshead 34 while same is in motion. Lever 48 and link 46 are so positioned that when the sheet clamping device is clamping the sheet, their centers are in line as shown in Fig. 4, and when not clamping as shown in Fig. 5, making a toggle arrangement that exerts great pressure on the feet 40 for a slight rotating force on shaft 49. Shaft 49 has a rocking motion which is communicated through the mechanism shown and just described. It receives this motion by means of a kidney-shaped cam 53 mounted on its end (see Figs. 3, 4 and 5) which engages with a pin 63 which is fastened to and moves with the shear blade frame 4, and is turned in position shown in Fig. 4 when the shear blade is traveling upward, thus clamping the sheet for its forward excursion; and is again turned to the position shown in Fig. 5 and the clamp is released when shear blade is traveling downward to cut the sheet and crosshead 34 is returning back over the sheet again to the position shown in Fig. 1, when the operation above described is repeated.

During the cutting operation the sheet is held by the following mechanism: Journaled on a pin 54 fastened near one end of bar 52 is a cam 64 with a slot 65 shaped as shown. (See Figs. 3, 6 and 7). Each of these cams 64 is pivotally connected to a link 66 which is pivotally connected to the pressure plate 67, the toggle device used being similar to that above described for clamping the sheet for the forward feed. Pins 68 also fastened to the shear crosshead 4 project into these slots 65 and when shear blade is traveling upward the cam takes the position shown in Fig. 7 when sheet can be moved, and when shear blade is traveling downward, nearing the cutting operation, the cam takes the position shown in Fig. 6, clamping the sheet while it is being cut.

As the sheet is sheared, the piece drops to a table 68 from which it is forced along by dogs 69, each mounted on a rod 70 which is slidably mounted in the brackets 71 and 72 shown. Rod 70 is actuated by means of a lever 73 fastened to shaft 14, being connected with said lever 73 by means of link 74, which is pivotally connected to rod 70 and lever 73. From table 68 the sheared piece, if it is desired, as it generally is, is pushed on to tilting table 75 fastened to and tilted by means of shaft 76 shown to the slitter or rotary shear cutters 77 and 79 mounted on shafts 78 and 80 respectively, which cutters run continuously when the shear is in operation. When the first or scrap edge of the sheet is cut, the table 75, which is controlled by the operator, is tilted by him when the scrap piece cut off passes under table 75 and does not become mixed with the good pieces.

With this metal cutting machine any size of pieces can be cut, since the travel of the sheet feeding crosshead 34 can be adjusted by means of the slot 26 and pin 27 on lever 25 and slot 29 on lever 28 above described.

In operation my machine operates as follows: The length of piece desired cut is adjusted as just described when machine is started and sheet of metal inserted when it is clamped by presser feet 40 and brought forward and clamped by the pressure plate 67 during the dwell of the movement. When the cutting operation starts and while this is going on, the sheet feeding device on crosshead 34 has released and is going back over the sheet until it "dwells" as above described, when the sheet is again clamped as just described during this dwell period and the operation is repeated. The operator, as soon as first or scrap piece is cut off, tilts the table 75 as above described, when the scrap is ejected from the machine by means of the dogs 69. The good material is passed along on table 75 to the slitter shown, to be further cut in the opposite direction from that in the shear.

It will be understood, of course, that while I have here shown and described one form of mechanism which can be used, I do not wish to limit myself to the exact form of the various devices shown but wish to have it taken in a sense diagrammatic of any and all devices which come within the scope of my invention.

I claim:

1. In a metal shearing machine, a shear blade having a vertical reciprocating motion, means for giving said shear blade said motion, a horizontally reciprocating sheet feeding crosshead with means for clamping a sheet of metal and means for giving said crosshead said motion, producing a short pause at each end of its excursion, during which time said sheet clamping means is actuated by means of a pin fastened to the shear blade.

2. In a metal shearing machine, a shear blade having a vertical reciprocating motion, means for giving said shear blade said motion, means for clamping a sheet of metal and means for advancing it under the shear blade, means for producing a pause in the movement of the sheet during which said clamping means operates and mechanism for clamping the said sheet during the shearing operation and means on the shear blade for actuating said clamping devices.

3. In a metal shearing machine, means for giving a sheet feeding crosshead a reciprocating motion with a pre-determined pause at the end of each excursion, comprising a continuously rotating disk, a pin fastened to said disk, a link block slidably mounted in a lever fastened to a shaft journaled in the frame of said machine, a cam groove in one side of said block in which said pin travels, a pin fastened to said block which travels in the space between two parallelly positioned bars fastened to the frame of the machine.

4. In a metal shearing machine, means for giving a sheet feeding crosshead a reciprocating motion with a pre-determined pause at the end of each excursion, comprising a continuously rotating disk, a pin fastened to said disk, a link block slidably mounted in a lever fastened to a shaft journaled in the frame of said machine, a cam groove in one side of said block in which said pin travels, a pin fastened to said block which travels in the space between two parallelly positioned bars fastened to the frame of the machine, in combination with means for adjusting the distance said crosshead travels.

5. In a metal shearing machine, means for giving a sheet feeding crosshead a reciprocating motion with a predetermined pause at the end of each excursion, comprising a continuously rotating disk, a pin fastened to said disk, a link block slidably mounted in a lever fastened to a shaft journaled in the frame of said machine, a cam groove in one side of said block in which said pin travels, a pin fastened to said block which travels in the space between two parallelly positioned bars fastened to the frame of the machine, in combination with means for adjusting the distance said crosshead travels, said means comprising a slot in said lever, a pin adjustably fastened in said slot, an arm fastened to a shaft journaled in the frame of the machine, a slot in said arm in which said pin travels, another lever fastened to said shaft and a link connecting said lever to said crosshead, substantially as shown and described.

6. In a metal shearing machine, a shear blade having a vertical reciprocating motion, means for giving said shear blade said motion, means for clamping a sheet of metal and means for advancing it under the shear blade, means for producing a pause in the movement of the sheet advancing means during which said clamping means operates and mechanism for clamping the said sheet during the shearing operation, with means on the shear crosshead for actuating said clamping devices and means for ejecting the cut pieces from the machine.

7. In a metal shearing machine, a shear blade having a vertical reciprocating motion, means for giving said shear blade said motion, a horizontally reciprocating sheet feeding crosshead with means for clamping a sheet of metal, means for giving said crosshead said motion, producing a pause at each end of its excursion, means for clamping the sheet during the shearing operation, means on the shear blade for actuating the sheet clamping devices and means for ejecting the pieces cut from the sheet, substantially as shown and described.

8. In a metal shearing machine, a shear blade having a vertical reciprocating motion, means for giving said shear blade said motion, a horizontally reciprocating sheet feeding crosshead with means for clamping a sheet of metal, means for giving said crosshead said motion, producing a pause at each end of its excursion, means for clamping the sheet during the shearing operation, means on the shear blade for actuating the sheet clamping devices and means for ejecting the pieces cut from the sheet, said means comprising a bar with a suitable finger fastened on one end, said bar being slidably mounted in the frame of the machine, with means for giving said bar a reciprocating motion, substantially as shown and described.

9. In a metal shearing machine, a shear blade having a vertical reciprocating motion, means for giving said shear blade said motion, a horizontally reciprocating sheet feeding crosshead with means for clamping a sheet of metal, means for giving said crosshead said motion, producing a pause at each end of its excursion, means for clamping the sheet during the shearing operation, means on the shear blade for actuating the sheet clamping devices and means for ejecting the pieces cut from the sheet, said means comprising a bar with a suitable finger fastened on one end, said bar being slidably mounted in the frame of the machine, with means for giving said bar a reciprocating motion, said means comprising a lever fastened to a shaft mounted in the frame of the machine and a link pivotally connected to said lever and said bar.

FREDERICK W. MATTHIESSEN, Jr.

Witnesses:
WILLIAM A. RADTKE,
OSCAR W. DAUBER.